(12) United States Patent
Lundquist

(10) Patent No.: US 6,436,294 B2
(45) Date of Patent: *Aug. 20, 2002

(54) PROCESS FOR MODIFYING THE METAL ION SORPTION CAPACITY OF A MEDIUM

(75) Inventor: Susan H. Lundquist, White Bear Township, MN (US)

(73) Assignee: 3M Innovative Properties Company, St. Paul, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,296

(22) Filed: Nov. 24, 1998

(51) Int. Cl.⁷ .............................. B01D 15/04; C02F 1/42

(52) U.S. Cl. ................. 210/674; 210/679; 210/682; 210/688; 502/408; 521/26

(58) Field of Search ................................ 210/670, 674, 210/682, 688, 679; 521/26; 502/408

(56) References Cited

U.S. PATENT DOCUMENTS

| | | | | |
|---|---|---|---|---|
| 3,928,192 A | * | 12/1975 | Katzakian et al. | 210/670 |
| 3,957,698 A | * | 5/1976 | Hatch | 210/673 |
| 3,971,373 A | | 7/1976 | Braun | 128/146.2 |
| 4,083,782 A | * | 4/1978 | Kunin | 210/674 |
| 4,437,271 A | | 3/1984 | McAvoy | 51/400 |
| 4,893,439 A | | 1/1990 | McAvoy et al. | 51/400 |
| 4,933,229 A | | 6/1990 | Insley et al. | 428/224 |
| 5,026,456 A | | 6/1991 | Hesler et al. | 162/146 |
| 5,030,496 A | | 7/1991 | McGurran | 428/85 |
| 5,071,610 A | | 12/1991 | Hagen et al. | 264/120 |
| 5,082,720 A | | 1/1992 | Hayes | 428/224 |
| 5,292,456 A | | 3/1994 | Francis et al. | 252/628 |
| 5,328,758 A | | 7/1994 | Markell et al. | 428/281 |
| 5,474,704 A | * | 12/1995 | Zaid | 210/674 |
| 5,770,090 A | * | 6/1998 | Lewis | 210/677 |
| 5,772,888 A | * | 6/1998 | Liu et al. | 210/634 |

OTHER PUBLICATIONS

Declaration of Thomas M. Kafka (with attached Exhibits A–D).

Edward R. Tompkins, "Laboratory Applications of Ion Exchange Techniques", *Journal of Chemical Education*, pp. 92–100, Jan. 1949.

A.J. Francis, "Removal and Recovery of Uranium and Toxic Metals from Contaminated Soils, Materials, and Wastes (BNL–Citric Acid Treatment Process)" from internet website, "http//w3.pnl.gov:2080/WEBTECH/ueld/lctric.html", Dec. 6, 1996, 9 pages.

Edward R. Tompkins, Application of Ion Exchange to the Seperation of Substances in Low Concentrations, Received Jul. 18, 1949, pp. 232–241.

Olaf Samuelson, *Ion Exchange Separations in Analytical Chemistry*, Almquist & Wiksell/Stockholm, John Wiley & Sons Inc., pp. 192–193, New York, 1963.

E.R. Tompkins et al., "A Study of the Effect of a Number of Column Variables," vol. 71, pp. 2504–2510, Jul. 1949.

Edward R. Tompkins, "Laboratory Applications of Ion Exchange Techniques," *Journal of Chemical Education*, pp. 92–100, Feb., 1949.

Waldo E. Cohn et al., "n–Exchangers to Separate, Concentrate and Purify Small Amounts of Ions," *Nucleonics*, pp. Nov. 22–23, 1948.

F.H. Spedding et al., "The Use of Copper as the Retaining Ion in the Elution of Rare Earths with Ammonium Ethylenediamine Tetraacetate Solutions," *J. Am. Chem. Soc.*, vol. 76, pp. 2557–2560, May 5, 1954.

Frank H. Spedding, "Large–Scale Separation of Rare–Earth Salts and the Preparation of the Pure Metals," Received Jul. 4, 1949, pp. 214–231.

Edward R. Tompkins et al., "Ion–Exchange as a Separations Method. I. The Separation of Fission–Produced Radioisotopes, Including Individual Rare Earths, by Complexing Elution from Amberlite Resin", *J. Am. Chem. Soc.*, vol. 69, pp. 2769–2777, Nov. 1947.

Darwin H. Harris and Edward R. Tompkins, "Ion Exchange as a Separation Method. II. Separations of Several Rare Earths of the Cerium Group (La, Ce, Pr and Nd)", *J. Am. Chem. Soc.*, vol. 69, pp. 2792–2800, Nov., 1947.

Edward R. Tompkins and Stanley W. Mayer, "Ion Exchange as a Separations Method. III. Equilibrium Studies of the Reactions of Rare Earth Complexes with Synthetic Ion Exchange Resins," *J. Am. Chem. Soc.*, vol. 69, pp. 2859–2865, 1947.

Stanley W. Mayer and Edward R. Tompkins, "Ion Exchange as a Separations Method. IV. A Theoretical Analysis of the Column Separations Process," *J. Am. Chem. Soc.*, vol. 69, pp. 2866–2874, Nov., 1947.

F. H. Spedding et al., "The Separation of Rare Earths by Ion Exchange. I. Cerium and Yttrium," *J. Am. Chem. Soc.*, vol. 69, pp. 2777–2781, Nov., 1947.

(List continued on next page.)

*Primary Examiner*—Ivars Cintins
(74) *Attorney, Agent, or Firm*—Gary L. Griswold; Robert W. Sprague; William J. Bond

(57) ABSTRACT

A process for modifying a medium is disclosed that includes treating a medium having a metal ion sorption capacity with a solution that includes: A) an agent capable of forming a complex with metal ions; and B) ions selected from the group consisting of sodium ions, potassium ions, magnesium ions, and combinations thereof, to create a medium having an increased capacity to sorb metal ions relative to the untreated medium.

16 Claims, No Drawings

OTHER PUBLICATIONS

F. H. Spedding et al., "The Separation of Rare Earths by Ion Exchange. II. Neodymium and Praseodymium," *J. Am. Chem. Soc.*, vol. 69, pp. 2786–2792, Nov., 1947.

F. H. Spedding et al., "The Separation of Rare Earths by Iion Exchange. III. Pilot Plant Scale Separations," *J. Am. Chem. Soc.*, vol. 69, pp. 2812–2818, Nov., 1947.

F. H. Spedding et al., "The Separation of Rare Earths by Ion Exchange. V. Investigations with One–tenth Per Cent. Citric Acid–Ammonium Citrate Solutions," *J. Am. Chem. Soc.*, vol. 72, pp. 2354–2361, Jun., 1950.

F. H. Spedding et al., "The Separation of Rare Earths by Ion Exchange. VI. Conditions for Effecting Separations with Nalcite HCR and One–tenth Per Cent. Citric Acid–Ammonium Citrate Solutions," *J. Am. Chem. Soc.*, vol. 73, pp. 4840–4847, 1951.

F. H. Spedding and J.E. Powell, "The Separation of Rare Earths by Ion Exchange. VIII. Quantitative Theory of the Mechanism Involved in Elution by Dilute Citrate Solutions," *J. Am. Chem. Soc.*, vol. 76, pp. 2550–2557, May 5, 1954.

* cited by examiner-

PROCESS FOR MODIFYING THE METAL ION SORPTION CAPACITY OF A MEDIUM

STATEMENT AS TO FEDERALLY SPONSORED RESEARCH

The invention was made with Government support under Contract DE-AR21-96MC-33089 awarded by the Department of Energy. The Government has certain rights in the invention.

BACKGROUND OF THE INVENTION

The invention relates to modifying the metal ion sorption capacity of a medium.

Water from waste streams, ground water, holding ponds, water treatment facilities, storage tanks, rivers, and streams can contain metals such as iron, zinc, cesium, plutonium, strontium, technetium, uranium, and americium. For environmental compliance, it is often desirable or necessary to remove these metals from the water.

A variety of methods have been developed for removing metals from the water in waste streams, ground water, holding ponds, water treatment facilities, storage tanks, rivers, and streams. Some of these methods include passing the water containing through a medium that removes the metal. The medium may be an ion exchange medium that is capable of sorbing the metal ions in the liquid. The medium is often packed in a column and once the medium is saturated with metal ions, the medium and/or column is discarded.

A method for removing metals from the medium involves eluting the metal ions from the medium with a strong acid followed by regenerating the medium with a strong base. These methods, however, do not always perform with the same level of effectiveness for all metals. For example, ion exchange media used for the removal of strontium frequently have a relatively low capacity for strontium due to large excesses of calcium and magnesium, which compete with the strontium for sites on the medium. Large excesses of calcium and magnesium relative to strontium are often present in waste streams and ground water.

A variety of agents can be used to elute metal ions from an ion exchange medium. Nitric acid and hydrochloric acid, for example, are often used to elute strontium from a strontium absorber. Nitric acid and hydrochloric acid, however, tend to cause a gradual increase in back pressure in systems in which they are employed as the eluant and in systems in which the medium is reconditioned.

SUMMARY OF THE INVENTION

The invention features a process for modifying a medium to increase its capacity to sorb (i.e., adsorb, absorb and combinations thereof) metal ions, as well as processes for regenerating the metal ion sorption capacity of a medium that has been exposed to metal ions, as well as the modified media, itself.

In one aspect, the invention features a process for modifying a medium that includes treating a medium having a metal ion sorption capacity with a solution that includes (a) an agent capable of forming a complex with metal ions, and (b) ions selected from the group consisting of sodium ions, potassium ions, magnesium ions or a combination thereof, to create a medium having an increased capacity to sorb metal ions relative to the untreated medium.

In preferred embodiments, the complexing agent is an organic acid (e.g., citric acid) and the ions are sodium ions. In some embodiments, the solution includes sodium azide. In other embodiments, the solution includes an organic acid and sodium hydroxide.

In preferred embodiments, the treating solution has a pH of between about 6 and 10, more preferably a pH of between about 7.5 and 8.5.

In one embodiment, the medium is capable of sorbing strontium ions. In other embodiments the medium is capable of sorbing mercury ions.

In another embodiment, the medium includes a membrane filled with particles, e.g., particles selected from the group consisting of particles of sodium titanate (i.e., sodium titanate, sodium nonatitanate, and combinations thereof), crystalline silico titanate, mixed salts of titanium silicate, sulfonated styrene divinyl benzene, SAMMS self-assembled monolayers on mesoporous supports specific for mercury analytes having a formula $SiO_2$—$CH_2CH_2$—$SH$, and combinations thereof.

In other embodiments, the medium includes sorbed metal ions.

In one embodiment, the process further includes contacting the treated medium with a liquid that includes metal ions such that the metal ions sorb onto the medium. The medium that includes sorbed metal ions can then be treated with an agent capable of forming a complex with metal ions for a period sufficient to elute the metal ions. One example of an agent capable of forming a complex with metal ions is a solution that includes an organic acid, e.g., citric acid and sodium hydroxide.

In one aspect, the invention features a process in which the back pressure produced during the process remains relatively constant during the process. In one embodiment, the process further includes providing a medium that includes sorbed metal ions, prior to treating the medium.

The process is useful for treating a medium (e.g., a solid phase ion exchange medium) that has sorbed metal ions (e.g., heavy metals, rare earth metals, and radioactive elements). The processes can regenerate (i.e., restore or increase) the metal ion sorption capacity of articles that have been previously contacted with a source of metal ions. The process is particularly useful in regenerating the ion sorption capacity of articles that are used to remove metal ion contaminates, and to treat aqueous streams from sources such as ground water, storage tanks, holding ponds, waste water treatment facilities, and nuclear waste storage tanks.

The process of the present invention improves the metal ion sorption capacity of an article relative to its metal ion adsorption capacity without treatment. In another embodiment, the process of the invention improves the metal ion sorption capacity of an article that includes sorbed metal ions. The processes according to the present invention also permit the maintenance of a relatively constant back pressure throughout the process.

Certain preferred processes according to the present invention are particularly well suited and can be optimized for the selective removal and recovery of strontium from a medium.

Other features and advantages of the invention will be apparent from the following description of the preferred embodiments thereof, and from the claims.

DETAILED DESCRIPTION

The process includes treating a medium having a metal ion adsorption capacity with a solution that includes: A) an agent capable of forming a complex with at least one metal ion; and B) ions selected from the group consisting of sodium, potassium, magnesium and combinations thereof, to increase the capacity of the medium to sorb metal ions relative to the untreated medium.

The treating solution is a buffer preferably having a pH in the range of about 5 to about 11, more preferably a pH in the range of about 6 to about 10, most preferably a pH in the range of about 7.5 to about 8.5. The treating solution includes a complexing agent capable of forming a complex with at least one metal ion. Preferred agents are capable of forming complexes with ions of, e.g., heavy metals, rare earth metals, actinides, and combinations thereof.

Examples of useful complexing agents include organic acids having more than one carboxyl group including citric acid, tartaric acid, oxalic acid, succinic acid, malonic acid, and ethylenediaminetetraacetic acid ("EDTA").

Other useful complexing agents include lactic acid, sulphosalicylates, acetylacetonante, and azides (e.g., sodium azide).

The treating solution also includes ions, e.g., sodium ions, potassium ions, magnesium ions and combinations thereof. The treating solution is brought to the desired pH by the addition of an appropriate amount of buffer adjusting solution, e.g., base, which also provides the ions. Examples of useful bases include metal hydroxides including, e.g., sodium hydroxide, potassium hydroxide, calcium hydroxide, and magnesium hydroxide, and sodium azide. The sodium azide can function as both the complexing agent and a source of sodium ions.

The addition of ions can be used to convert substantially all of the particles in the medium to a single salt form, e.g., the sodium form, such that the medium exhibits an increased propensity to selectively sorb predetermined ions, e.g., cations or anions. Preferably ions are added to convert substantially all of the medium to the sodium salt form. Preferably the medium exhibits a propensity to selectively sorb strontium ions.

The treating solution is used to treat a medium that is capable of sorbing metal ions. The medium includes particles capable of removing ions from fluids through mechanisms such as, e.g., ion exchange (e.g., solid phase ion exchange), chelation, covalent bond formation, and sorption (e.g., adsorption, absorption and combinations thereof). Preferably the medium is capable of sorbing ions of radioactive particles, metals (e.g., heavy metals, rare earth metals, alkaline earth metals, and combinations thereof) and combinations thereof. Useful media sorb ions of metals from Groups IA, IIA, IB, IIB, IIIB, and VIII of the periodic table. Preferably the medium is capable of sorbing ions of metals such as, e.g., cesium strontium, silver, cobalt, chromium, gold, mercury, uranium, americium, plutonium, copper, iron, technetium, lead, zinc, and rhenium.

Typically the medium consists of finely divided, microporous particles. Preferably the particles have a relatively large area of active surface and a uniform size distribution. Useful particles have an average particle size in the range of about 1 $\mu$m to about 100 $\mu$m, preferably about 2 $\mu$m to about 75 $\mu$m, more preferably about 9 $\mu$m to about 18 $\mu$m. Suitable particles include inorganic, organic, and combinations thereof. Preferably the particles are ionically charged (e.g., cationic and anionic particles).

Useful inorganic media include metal titanates, where the metal is selected form Group IA and Group IIA metals (e.g., sodium titanate which includes nonatitanate), silicotitanates (e.g., crystalline silico titanate, and mixed salts of titanium silicates) and combinations thereof. Examples of commercially available inorganic particles include sodium titanates (available from Allied Signal Corp., Chicago, Ill.), crystalline silico titanates (available under the trade designation IONSIV from UOP of Tarrytown, N.Y.), sorbent particles available under the trade designation ATS from Engelhard Corporation, Iselin, N.J., and high capacity resins available under the trade designation NALCITE from Nalco Chemical Co., Naperville, Ill.

Examples of useful organic media include sulfonated styrene divinyl benzene resins (commercially available, e.g., under the trade designation CATEX from Sarasep Corp., Santa Clara, Calif.)), organic anion sorber (commercially available under the trade designation ANEX from Serasep), and organic cation sorber (commercially available under the trade designation DIPHONIX from Ichrome Industries of Chicago, Ill.).

Other useful commercially available particles include SAMMS self-assembled monolayers on mesoporous supports specific for mercury analytes having a formula $SiO_2$—$CH_2CH_2$—SH (from Batelle Memorial Institute, Pacific Northwest National Labs, Richland, Wash.), and Clinoptolite.

The medium can also include derivatized particles. Useful derivatized particles include polymeric coated oxide particles and organic moieties covalently bonded to inorganic oxide particles. Derivatized particles are described, e.g., in U.S. Pat. Nos. 5,393,892 (Krakowiak), 5,334,326 (Bostick), 5,316,679 (Bruening), 5,273,660 (Bruening), and 5,244,856 (Bruening) and incorporated herein by reference.

The particles can be enmeshed in a variety of fibrous, nonwoven webs, which preferably are porous. Examples of such webs include polymer pulps, fibrillated polytetrafluoroethylene (PTFE), microfibrous webs, and macrofibrous webs. Examples of particle filled webs are described in U.S. Pat. Nos. 5,328,758 (Markell et al.), 5,071,610 (Hagen et al.), 5,082,720 (Hayes), and 3,971,373 (Braun), the disclosures of which are incorporated herein by reference. Other useful media may include those media described in U.S. Ser. No. 08/791,205 entitled, "Spiral Wound Extraction Cartridge," which was filed on Feb. 13, 1997; U.S. Ser. No. 08/918,113 entitled, "Absorbent for Metal Ions and Method for Making and Using," which was filed on Aug. 27, 1997; and PCT publication WO96/29146 published Sep. 26, 1996 and incorporated herein by reference.

Another useful medium includes sponge-like (i.e., porous) medium prepared by compacting spray dried particles under low pressure (e.g., hand pressure) into a confined space and heating the compacted particles to a temperature of about 130° C. for about 72 hours results. Such sponge-like media exhibit excellent separating ability and relatively low back pressure during use. Useful sponge-like media are described in U.S. Ser. No. 08/960,528 filed on Oct. 31, 1997 and incorporated herein by reference.

The medium can be in the form of an article such as, e.g., membranes (e.g., particle embedded membranes, and particle filled membranes), particle filled microfiber webs, particle coated filter paper, cartridges, columns (e.g., chromatography columns, short packed columns), disks and sheets.

The invention will now be described further by way of the following examples.

Objects and advantages of this invention are further illustrated by the following examples, but the particular materials and amounts thereof recited in these examples, as well as other conditions and details, should not be construed to unduly limit this invention.

EXAMPLES

Example 1 and Comparative Example A

Example 1 and Comparative Example A show the Sr ion loading of a solid phase extraction ("SPE") media disk preconditioned with a pH 8 buffer solution (Example 1) and a SPE disk that had not been preconditioned with the pH 8 buffer solution (Comparative Example A).

The pH 8 buffer solution was prepared as follows. A 0.23 Molar citric acid solution was prepared by dissolving 48.33 grams of citric acid monohydrate (obtained from J.T. Baker, Phillipsburg, N.J.) in a sufficient amount of deionized water to provide 1 liter of solution. A 0.5 Molar NaOH solution was prepared by dissolving 20 grams of NaOH (obtained from E.M. Science, Gibbstown, N.J.) in a sufficient amount of deionized water to provide 1 liter of solution. About 564 grams of the 0.5 M NaOH solution were added to 404 grams of the 0.23 M citric acid solution to provide the pH 8 buffer solution.

An extraction medium was prepared by first mixing 13.20 grams (dry weight) of aramid fiber pulp (obtained under the trade designation "KEVLAR IF306" from E.I. Dupont, Inc., Wilmington, Del.) with 2000 ml of hot water in a 4 liter laboratory Waring blender at low speed for 30 seconds to form a slurry. About 0.25 gram of a nonionic dispersant (obtained under the trade designation "TAMOL 850" from Rohm and Haas, Philadelphia, Pa.) was added to the slurry and blended in at the low speed setting for 30 seconds. Next, 43.80 grams of sorbent particles (obtained under the trade designation "ATS" from Engelhard Corporation, Iselin, N.J.), containing a mixed salt of titanium silicate, were added to the slurry and blended in at the low speed setting for 30 seconds. About 7.5 grams latex binder (3.0 grams of styrene-butadiene (obtained under the trade designation "GOODRITE 1800×73" from B.F. Goodrich Co., Cleveland, Ohio) dissolved in 4.5 grams of deionized water were added to the slurry and blended in at low speed for 30 seconds. Next, 25 grams of a 25% aluminum sulfate aqueous solution (obtained from Aldrich Chemicals of Milwaukee, Wis.) were added to the slurry and blended at low speed for 30 seconds. About 1.4 gram of a 10% acrylamide modified cationic copolymer solution, a flocculating agent (obtained under the trade designation "NALCO 7530" from Nalco Chemical Company, Naperville, Ill.) were added to the slurry and blended in at low speed for about 4 seconds.

A handsheet was prepared by pouring a portion of the resulting slurry into a sheet mold apparatus (obtained from Williams Apparatus Co., Watertown N.Y.). The apparatus was equipped with a 413 square centimeter porous screen having a pore size of 80 mesh (177 micrometers) at the bottom to allow for drainage. The poured slurry was allowed to drain for 15 seconds. The resulting wet sheet was pressed for 5 minutes at 620 kPa using in a pneumatic press (Mead Fluid Dynamics, Chicago, Ill.). The pressed handsheet was then dried for 120 minutes at 135° C.

Two 25 mm diameter disks were cut out of the extraction medium (i.e., the dried handsheet). For each of Example 1 and Comparative Example A, one of the 25 mm diameter disks were placed in a stainless steel disk holder (#1209; obtained from Pall/Gelman Sciences, Ann Arbor, Mich.). The disk holder was attached to the top of a flask. A pump (Model 7553-80 with a Model 7518-00 pump head both from (Cole Parmer Instrument Company, Vernon Hills, Ill.) was used to pump the pH 8 buffer solution through tubing (obtained under the trade designation "MASTERFLEX PHARMED TUBING #6485-14" from Cole-Parmer Instrument Company, Vernon Hills, Ill.) from a bottle to the disk holder assembly. A pressure gauge (obtained under the trade designation "ASHCROFT PRESSURE GAUGE," (Model #3NA22422-013 from Dressler Industries, Stratford, Conn.) was in line between the bottle containing the pH 8 buffer solution and the disk holder assembly. The buffer solution was pumped through the extraction medium for 30 minutes at a flow rate of 5 ml per minute. The flow diameter of the 25 mm disk extraction medium disk was about 22 mm.

An analyte matrix solution (also referred to as a "challenge solution") was prepared by adding (and then mixing) a sufficient amount of each of various salts (see Table 1, below) to deionized water to provide the concentration of ions shown in Table 1. The total volume of the resulting challenge solution was 20 liters. The pH of the challenge solution was adjusted to 7.5 with 1 N sodium hydroxide (obtained from Fisher Scientific, Fair Lawn, N.J.).

TABLE 1

| ppm in solution | Molarity, moles/liter | Salt | Manufacturer |
| --- | --- | --- | --- |
| 54.5 Ca ions | $1.36 \times 10^{-3}$ | $Ca(NO_3)_2 4 H_2O$ | EM Science, Gibbstown, NJ |
| 0.074 Cu ions | $1.01 \times 10^{-6}$ | $Cu(NO_3)_2 2.5 H_2O$ | J. T Baker, Phillipsburg, NJ |
| 1.75 Fe ions | $1.16 \times 10^{-6}$ | $Fe(NO_3)_3 9 H_2O$ | J. T Baker |
| 0.0248 Pb ions | $3.13 \times 10^{-5}$ | $Pb(NO_3)_2$ | Aldrich Chemical Co., Milwaukee, WI |
| 0.0332 Cr ions | $8.11 \times 10^{-4}$ | $Cr(NO_3)_2 9H_2O$ | Fisher Scientific, Fair Lawn, NJ |
| 0.399 Zn ions | $1.20 \times 10^{-7}$ | $Zn(NO_3)_2 xH_2O$ | Mallinckrodt Inc, Paris, KY |
| 0.139 Ba ions | $6.39 \times 10^{-7}$ | $Ba(NO_3)_2$ | Mallinckrodt, Inc, |
| 19.7 Mg ions | $3.87 \times 10^{-3}$ | $Mg(NO_3)_2 6H_2O$ | Fisher Chemical |

TABLE 1-continued

| ppm in solution | Molarity, moles/liter | Salt | Manufacturer |
|---|---|---|---|
| 89 Na ions | $6.10 \times 10^{-6}$ | $NaNO_3$ | J. T. Baker |
| 0.3 Sr ions | $3.42 \times 10^{-6}$ | $Sr(NO_3)_2$ | Aldrich Chemical Co. |

The analyte matrix solution, which was continually stirred, was pumped through each of the Example 1 and Comparative Example A disk holders at a rate of about 5 ml/minute. The solution passed through the respective disks was collected in a collection bottle. Six ml sample fractions of the passed solution were taken after 2, 10, 20, 30, 45, 60, 80, 100, 120, 140, 160 and 180 minutes of flow. Further, sample fractions of the initial and final feed solution were also taken. Two 6 ml samples were taken from each of the respective collection bottles. One drop of 1M nitric acid (Fisher Scientific) was added as a preservative to each sample. The samples were analyzed for Sr ions using an inductively coupled plasma analyzer (obtained under the trade designation "PERKIN-ELMER OPTIMA 3000DV" from Perkin Elmer, Norwalk, Conn.) and EPA Test Method 200.7 ("Determination of Metals and Trace Elements In Water And Wastes By Inductively Coupled Plasma-Atomic Emission-Spectroscopy", Revision 4.4, EMMC Version, Environmental Monitoring Systems Laboratory, Office of Research And Development, U.S. Environmental Protection Agency, 1994), the disclosure of which is incorporated herein by reference.

The results and other details are shown in Table 2, below.

TABLE 2

| Comparative Example A | | | Example 1 | | |
|---|---|---|---|---|---|
| Disk weight: 0.61 gram | | | Disk weight: 0.78 gram | | |
| % particle in medium: 68.9% | | | % particle in medium: 68.9% | | |
| Weight particle in medium: 0.420 gram | | | Weight particle in medium: 0.537 gram | | |
| Disk thickness: 0.198 cm | | | Disk thickness: 0.213 cm | | |
| Bed volume @ 22 mm: 0.752 ml | | | Bed volume @ 22 mm: 0.810 ml | | |
| Bed volumes passed | Concentration of Sr, ppm | C/Co for Sr (Co = 0.28 ppm) | Bed volumes passed | Concentration of Sr, ppm | C/Co for Sr (Co = 0.29 ppm) |
| 0 | 0.01 | 0.035 | 0 | 0.00 | 0.035 |
| 66 | 0.03 | 0.107 | 62 | 0.00 | 0.035 |
| 132 | 0.09 | 0.321 | 123 | 0.00 | 0.035 |
| 199 | 0.11 | 0.393 | 185 | 0.01 | 0.035 |
| 302 | 0.14 | 0.500 | 277 | 0.05 | 0.172 |
| 402 | 0.15 | 0.535 | 370 | 0.06 | 0.207 |
| 535 | 0.17 | 0.607 | 493 | 0.09 | 0.310 |
| 668 | 0.19 | 0.679 | 616 | 0.10 | 0.345 |
| 793 | 0.19 | 0.679 | 740 | 0.12 | 0.414 |
| 925 | 0.20 | 0.714 | 863 | 0.13 | 0.448 |
| 1058 | 0.20 | 0.714 | 986 | 0.14 | 0.483 |
| 1191 | 0.21 | 0.750 | 1110 | 0.15 | 0.517 |
| Capacity @ 50% breakthrough*: 0.0106 g Sr/100 g particle | | | Capacity @ 50% breakthrough 0.0344 g Sr/100 g particle | | |

*Capacity breakthrough (C/Co for Sr) at 50% means the concentration of analyte over initial concentration at 50% bed volume.

The Example 1 disk maintained a lower back pressure than did the Comparative Example A disk. The Example 1 disk had a 50% break through occur at a bed volume of about 1100 ml of challenge solution.

Example 2 and Comparative Example B

Example 2 and Comparative Example B show the Hg ion loading of a solid phase extraction ("SPE") media disk preconditioned with a pH 8 buffer solution (Example 1) and a SPE disk that had not been preconditioned with the pH 8 buffer solution (Comparative Example A).

Example 2 and Comparative Example B were carried out as described for Example 1 and Comparative Example B, respectively, except (a) the sorbent particles were a mercury sorbent (SAMMS (Self-assembled monolayers on mesoporous supports) obtained from Pacific Northwest National Laboratory, Richland, Wash.) rather than the sorbent particles containing a mixed salt of titanium silicate; (b) the analyte matrix solution was prepared by dissolving a sufficient amount of mercuric chloride (obtained from salt Fisher Scientific Company, Fair Lawn, N.J.) in deionized water to provide a solution containing 100 ppm Hg ions; and (c) the concentration of Hg ions was analyzed using Method 3112, "Metals by Cold-Vapor Atomic Absorption Spectrometry", *Standard Methods for the Examination of Water and Wastewater*, $19^{th}$ edition, 1995, and an analyzer obtained under the trade designation "LEEMAN LABS PS200 AUTOMATED MERCURY ANALYZER" from Leeman Labs, Hudson, N.H. The results and other details are shown in Table 3, below.

TABLE 3

| Comparative Example B | | | Example 2 | | |
|---|---|---|---|---|---|
| Disk weight: 0.34 gram | | | Disk weight: 0.32 gram | | |
| % particle in medium: 73.1% | | | % particle in medium: 73.1% | | |
| Weight particle in medium: 0.249 gram | | | Weight particle in medium: 0.234 gram | | |
| Disk thickness: 0.072 inch 0.0283 cm | | | Disk thickness: 0.072 inch 0.0283 cm | | |
| Bed volume @ 22 mm: 0.695 ml | | | Bed volume @ 22 mm: 0.695 ml | | |
| Bed volumes passed | Concentration of Hg, ppm | C/Co for Hg (Co = 80. ppm) | Bed volumes passed | Concentration of Hg, ppm | C/Co for Hg (Co = 160 ppm) |
| 0 | 0 | 0 | 0 | 0 | 0 |
| 36 | 13.64 | 0.17 | 37 | 0 | 0 |
| 72 | 17.38 | 0.21 | 75 | 0.11 | 0.0007 |
| 108 | 19.69 | 0.24 | 112 | 2.2 | 0.0138 |
| 144 | 21.89 | 0.27 | 149 | 5.4 | 0.0338 |
| 180 | 23.32 | 0.29 | 187 | 9.2 | 0.0575 |
| 216 | 25.74 | 0.32 | 224 | 20 | 0.125 |
| 433 | 37.40 | 0.46 | 449 | 37 | 0.231 |
| 649 | 49.39 | 0.61 | 898 | 54 | 0.337 |
| 866 | 56.21 | 0.69 | 1122 | 69 | 0.431 |
| 1082 | 61.38 | 0.76 | 1347 | 72 | 0.45 |
| 1297 | 64.68 | 0.80 | 1459 | 64 | 0.40 |
| Capacity @ 50% breakthrough: 7.67 g Hg/100 g particle | | | Capacity @ 50% breakthrough: 64.87 g Hg/100 g particle | | |

The Example 2 disk maintained a lower back pressure than the Comparative Example B disk.

Examples 3–5 and Comparative Example C

Examples 3–5 and Comparative Example C showed the Sr ion loading of a SPE disk preconditioned with a pH 8 buffer solution neutralized by 0.5 M sodium hydroxide solution (i.e., using the Example 1 buffer solution) (Example 3), potassium hydroxide (Example 4), and magnesium hydroxide (Example 5), respectively, and a SPE disk that had not been preconditioned with a buffer solution (Comparative Example C).

Examples 3–5 and Comparative Example C were carried out as described for Example 1 and Comparative Example C, respectively, except the respective buffer solutions for Examples 4 and 5 were prepared as described below.

For Example 4, a pH 8 buffer solution was prepared as follows. A 0.23 Molar citric acid solution was prepared by dissolving 48.33 grams of citric acid monohydrate (obtained from J.T. Baker, Phillipsburg, N.J.) in a sufficient amount of deionized water to provide 1 liter of solution. A 0.5 Molar KOH solution was prepared by dissolving 28.1 grams of KOH (obtained from EM Science, Gibbstown, N.J.) in a sufficient amount of deionized water to provide 1 liter of solution. About 637.71 grams of the 0.5 M KOH solution were added to 400 grams of the 0.23 M citric acid solution to provide the pH 8 buffer solution.

For Example 5, a pH 8 buffer solution was prepared as follows. A 0.23 Molar citric acid solution was prepared by dissolving 48.33 grams of citric acid monohydrate (obtained from J.T. Baker, Phillipsburg, N.J.) in a sufficient amount of deionized water to provide 1 liter of solution. A 0.5 Molar magnesium hydroxide solution was prepared by dissolving 29.2 grams of $Mg(OH)_2$ (obtained from Fisher Scientific, Fair Lawn, N.J.) in a sufficient amount of deionized water to provide 1 liter of solution. About 329.7 grams of the 0.5 M magnesium hydroxide solution were added to 404.85 grams of the 0.23 M citric acid solution to provide the pH 8 buffer solution.

The results and other details are shown in Table 4, below.

successively repeated four times (i.e., four cycles). The back pressure, as measured with the pressure gauge 5 cm from the disk, at the end of each loading with the analyte matrix was measured and is reported in Table 7, below.

TABLE 7

| Cycle | Back pressure, kPa |
|---|---|
| 1 | 24.1 |
| 2 | 34.5 |
| 3 | 68.9 |
| 4 | 124 |
| 5 | 124 |

Example 7

Example 7 was carried out as described for Example 1 except (a) the initial treatment (i.e., the preconditioning) of the SPE disk with the buffer solution was for 45 minutes at a flow rate of 5 ml/min; and (b) the steps of loading the disk with the analyte matrix at a flow rate of 5 ml/min. for 60 minutes, eluting the disk with the buffer solution at a flow rate of 1.2 ml/min. for 30 minutes, and then rinsing the disk with deionized water for 30 minutes at a flow rate of 1.2 ml/min., were each successively repeated four times (i.e., four cycles). The back pressure, as measured with the pressure gauge 5 cm from the disk, at the end of each loading

TABLE 4

| Comparative Example C | Example 3 | Example 4 | Example 5 |
|---|---|---|---|
| Disk weight: 0.76 gram | Disk weight: 0.78 gram | Disk weight: 0.75 gram | Disk weight: 0.73 gram |
| % particle in medium: 68.9% | % particle in medium: 68.9% | % particle in medium: 68.9% | % particle in medium: 68.9% |
| Weight particle in medium; 0.524 gram | Weight particle in medium 0.537 gram | Weight particle in medium 0.517gram | Weight particle in medium 0.502 gram |
| Disk thickness: 0.082 inch 0.0322 cm | Disk thickness: 0.084 inch 0.033 cm | Disk thickness: 0.090 inch 0.035 cm | Disk thickness: 0.078 inch 0.0307 cm |
| Bed volume @ 22 mm: 0.791 ml | Bed volume @ 22 mm: 0.810 ml | Bed volume @ 22 mm: 0.869 ml | Bed volume @ 22 mm: 0.753 ml |

| Bed volumes passed | Conc. of Sr, ppm | C/Co for Sr (Co = 0.35 ppm) | Bed volumes passed) | Conc. of Sr, ppm | C/Co for Sr (Co = 0.29 ppm) | Bed volumes passed | Conc. of Sr, ppm | C/Co for Sr (Co = 0.37 ppm) | Bed Volumes passed | Conc. of Sr, ppm | C/Co for Sr (Co = 0. ppm) |
|---|---|---|---|---|---|---|---|---|---|---|---|
| 0 | 0 | 0 | 0 | 0 | 0 | 0 | 0 | 0 | 0 | 0 | 0 |
| 32 | 0.1 | 0.28 | 30.5 | 0.01 | 0.035 | 25 | 0.1 | 0.27 | 35 | 0.06 | 0.16 |
| 64 | 0.12 | 0.34 | 61 | 0.01 | 0.035 | 52 | 0.1 | 0.27 | 70 | 0.09 | 0.25 |
| 128 | 0.16 | 0.45 | 123 | 0.01 | 0.035 | 104 | 0.12 | 0.32 | 138 | 0.09 | 0.25 |
| 193 | 0.18 | 0.51 | 185 | 0.01 | 0.035 | 160 | 0.14 | 0.37 | 205 | 0.10 | 0.28 |
| 290 | 0.21 | 0.6 | 277 | 0.05 | 0.17 | 242 | 0.17 | 0.46 | 307 | 0.12 | 0.33 |
| 386 | 0.22 | 0.62 | 370 | 0.06 | 0.20 | 327 | 0.19 | 0.51 | 411 | 0.14 | 0.38 |
| 515 | 0.26 | 0.74 | 493 | 0.09 | 0.31 | 442 | 0.22 | 0.59 | 549 | 0.17 | 0.47 |
| 644 | 0.27 | 0.77 | 616 | 0.1 | 0.34 | 558 | 0.23 | 0.62 | 687 | 0.20 | 0.55 |
| 773 | 0.26 | 0.74 | 740 | 0.12 | 0.41 | 675 | 0.24 | 0.64 | 825 | 0.21 | 0.58 |
| 902 | 0.28 | 0.80 | 863 | 0.13 | 0.44 | 791 | 0.25 | 0.67 | 963 | 0.22 | 0.61 |
| 1031 | 0.28 | 0.80 | 986 | 0.14 | 0.48 | 907 | 0.26 | 0.70 | 1101 | 0.23 | 0.63 |
| 1160 | 0.28 | 0.80 | 1110 | 0.15 | 0.51 | 1024 | 0.26 | 0.70 | 1240 | 0.28 | 0.78 |
| Capacity @ 50% breakthrough: 0.00602 g Sr/100 g particle | | | Capacity @ 50% breakthrough: 0.0344 g Sr/100 g particle | | | Capacity @ 50% breakthrough: 0.0133 g Sr/100 g particle | | | Capacity @ 50% breakthrough: 0.0194 g Sr/100 g particle | | |

Example 6

Example 6 was carried out as described for Example 1 except (a) the initial treatment (i.e., the preconditioning) of the SPE disk with the buffer solution was for 45 minutes at a flow rate of 5 ml/min; and (b) the steps of loading the disk with the analyte matrix at a flow rate of 5 ml/min. for 60 minutes and then eluting the disk with the buffer solution at a flow rate of 1.2 ml/min. for 30 minutes, were each with the analyte matrix was measured and is reported in Table 8, below.

TABLE 8

| Cycle | Back pressure, kPa |
|---|---|
| 1 | 10.3 |
| 2 | 6.9 |

TABLE 8-continued

| Cycle | Back pressure, kPa |
|---|---|
| 3 | 10.3 |
| 4 | 10.3 |
| 5 | 20.6 |

Examples 8 and 9

Examples 8 and 9 were carried out as described for Example 1 except (a) the buffer solutions and eluants for Examples 8 and 9 were prepared as described below; (b) the sorbent particles were particles containing sodium nonatitanate (obtained from Allied Signal, Morristown, N.J.); (c) the initial treatment (i.e., the preconditioning) of the SPE disk with the buffer solution was for 45 minutes at a flow rate of 5 ml/min; and (d) the steps of loading the disk with the analyte matrix at a flow rate of 5 ml/min. for 60 minutes and then eluting the disk with the buffer solution at a flow rate of 1.2 ml/min. for 30 minutes, were each successively repeated four times (i.e., four cycles).

For Example 8, a pH 8 buffer solution was prepared as follows. A 0.23 Molar tartaric acid solution was prepared by dissolving 34.5 grams of tartaric acid (obtained from Aldrich Chemical, Milwaukee, Wis.) in a sufficient amount of deionized water to provide 1 liter of solution. A 0.5 Molar NaOH solution was prepared by dissolving 20 grams of NaOH (obtained from E.M. Science, Gibbstown, N.J.) in a sufficient amount of deionized water to provide 1 liter of solution. About 342.5 grams of the 0.5 M NaOH solution were added to 366 grams of the 0.23 M tartaric acid solution to provide the pH 8 buffer solution.

For Example 9, a pH 8 buffer solution was prepared as follows. A 0.23 Molar Ethylenediaminetetraacetic acid ("EDTA") solution was prepared by dissolving 67.21 grams of EDTA (obtained from Aldrich Chemical Company, Milwaukee, Wis.) in a sufficient amount of deionized water to provide 1 liter of solution. A 0.5 Molar NaOH solution was prepared by dissolving 20 grams of NaOH (obtained from E.M. Science, Gibbstown, N.J.) in a sufficient amount of deionized water to provide 1 liter of solution. About 315 grams of the 0.5 M NaOH solution were added to 400.6 grams of the 0.23 M EDTA solution to provide the pH 8 buffer solution.

The back pressure, as measured with the pressure gauge 5 cm from the disk, at the end of each loading with the analyte matrix was measured and are reported in Table 9, below.

TABLE 9

| Cycle | Example 8 Back pressure, kPa | Example 9 Back pressure, kPa |
|---|---|---|
| 1 | 6.9 | 6.9 |
| 2 | 6.9 | 6.9 |
| 3 | 10.3 | 6.9 |
| 4 | — | 10.3 |

Example 10

Example 10 was carried out as described for Example 1 except (a) the buffer solution and eluant was a pH 8.0 organic acid/base buffer solution prepared as described below; (b) the sorbent particles were particles containing sodium nonatitanate (obtained from Allied Signal, Morristown, N.J.); (c) the initial treatment (i.e., the preconditioning) of the SPE disk with the buffer solution was for 60 minutes at a flow rate of 5 ml/min; and (d) the steps of loading the disk with the analyte matrix at a flow rate of 5 ml/min. for 60 minutes and then eluting the disk with the buffer solution at a flow rate of 1.2 ml/min. for 30 minutes, were each successively repeated three times (i.e., three cycles).

The organic acid/base buffer solution was prepared as follows. A 0.23 Molar sodium azide solution was prepared by dissolving 14.95 grams of sodium azide (obtained from Aldrich Chemical Company) in a sufficient amount of deionized water to provide 1 liter of solution. The solution had a pH of 8.

The back pressure, as measured with the pressure gauge 5 cm from the disk, at the end of each loading with the analyte matrix was measured and are reported in Table 10, below.

TABLE 10

| Cycle | Back pressure, kPa |
|---|---|
| 1 | 6.9 |
| 2 | 20.6 |
| 3 | 20.6 |

Various modifications and alterations of this invention will become apparent to those skilled in the art without departing from the scope and spirit of this invention, and it should be understood that this invention is not to be unduly limited to the illustrative embodiments set forth herein.

Other embodiments are within the claims.

What is claimed is:

1. A process for modifying a medium comprising:
   preconditioning a medium by treating a medium including a membrane comprising particles, and having a metal ion sorption capacity, with a buffer solution having a pH in the range of 6 to 10 comprising
   (a) an agent capable of forming a complex with metal ions, and
   (b) ions selected from the group consisting of sodium ions, potassium ions, magnesium ions, and a combination thereof,
   said particles in said medium being selected from the group consisting of sodium titanate, crystalline silico titante, mixed salts of titanium silicate, sulfonated styrene divinyl benzene, SAMMS, and a combination thereof, to create a preconditioned medium having an increase capacity to sorb metal ions relative to said untreated medium.

2. The process of claim 1, wherein said agent comprises an organic acid and said ions are sodium ions.

3. The process of claim 1, wherein said agent is citric acid and ions are sodium ions.

4. The process of claim 1, wherein said solution comprises sodium azide.

5. The process of claim 1, wherein said solution comprises an organic acid and sodium hydroxide.

6. The process of claim 1, wherein said solution has a pH of between about 7.5 and 8.5.

7. The process of claim 1, wherein said medium is capable of sorbing strontium ions.

8. The process of claim 1, wherein said medium is capable of sorbing mercury ions.

9. The process of claim 1, wherein said medium comprises sorbed metal ions.

10. The process of claim 1, further comprising contacting said treated medium with a liquid comprising metal ions such that said metal ions sorb onto said medium.

11. The process of claim 10, further comprising treating said medium comprising sorbed metal ions with an agent capable of forming a complex with metal ions for a period sufficient to elute said metal ions.

12. The process of claim 11, wherein said the agent capable of forming a complex with metal ions comprises a solution comprising citric acid and sodium hydroxide.

13. The process of claim 10, further comprising treating said medium comprising sorbed metal ions with a solution comprising an organic acid and sodium hydroxide for a period sufficient to elute said metal ions.

14. The process of claim 10, wherein a back pressure produced during said process remains relatively constant during said process.

15. The process of claim 1 further comprising providing a medium comprising sorbed metal ions, prior to treating said medium.

16. A process for modifying a medium comprising:

treating a medium having enmeshed therein silicotitanate particles and having a metal ion sorption capacity with a solution comprising
(a) citric acid, and
(b) sodium ions, to create a medium having an increased capacity to sorb metal ions relative to said untreated medium.

* * * * *